Sept. 26, 1967  E. H. BENDOFF  3,343,662
PACKAGING MEANS FOR SHADOW MASKS AND THE LIKE
Filed Sept. 9, 1965  5 Sheets-Sheet 1
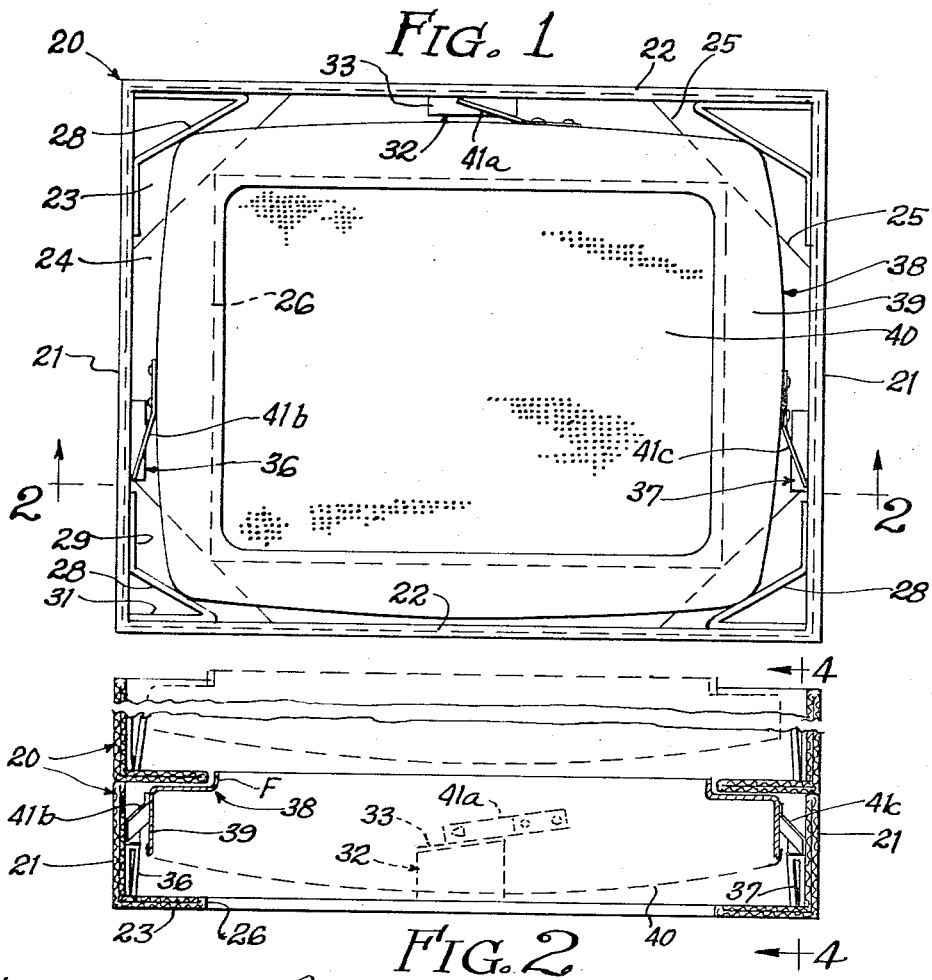
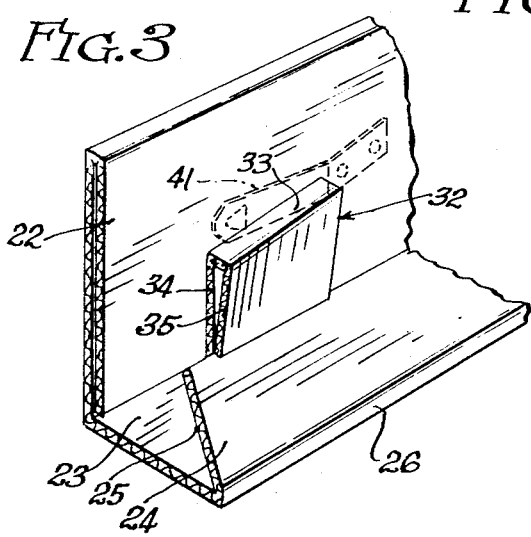
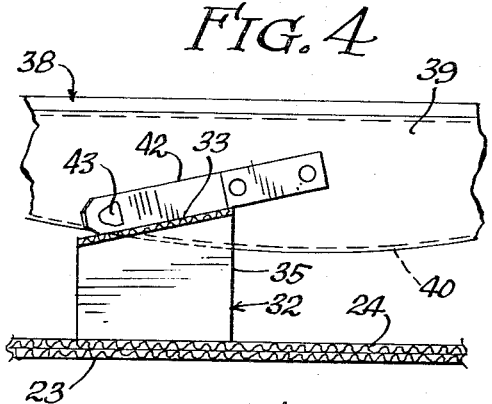
INVENTOR
Edward H. Bendoff
By Nathan N. Kraus
Frank H. Marks
Att'ys Sept. 26, 1967 E. H. BENDOFF 3,343,662
PACKAGING MEANS FOR SHADOW MASKS AND THE LIKE
Filed Sept. 9, 1965 5 Sheets-Sheet 3
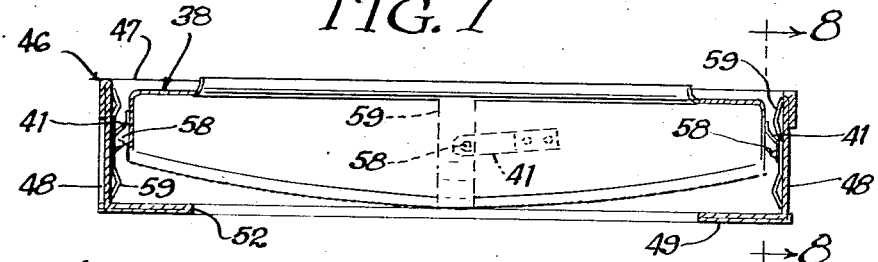
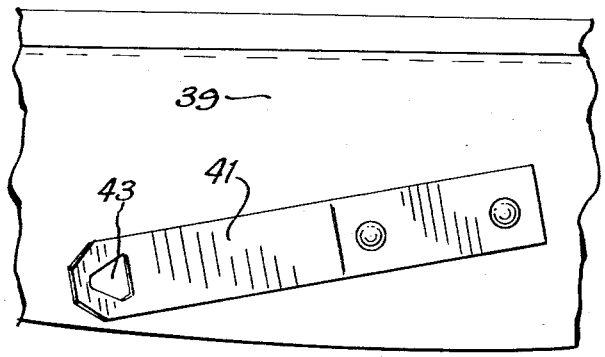
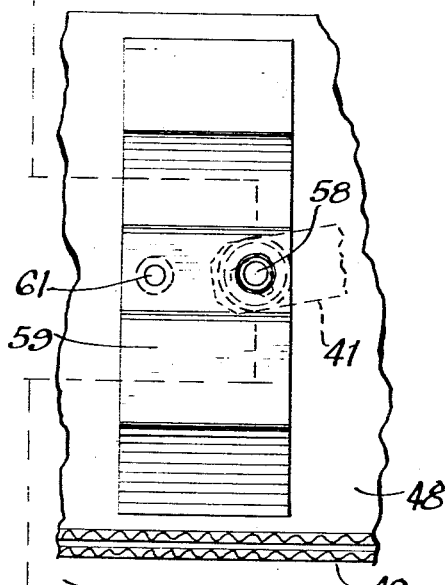
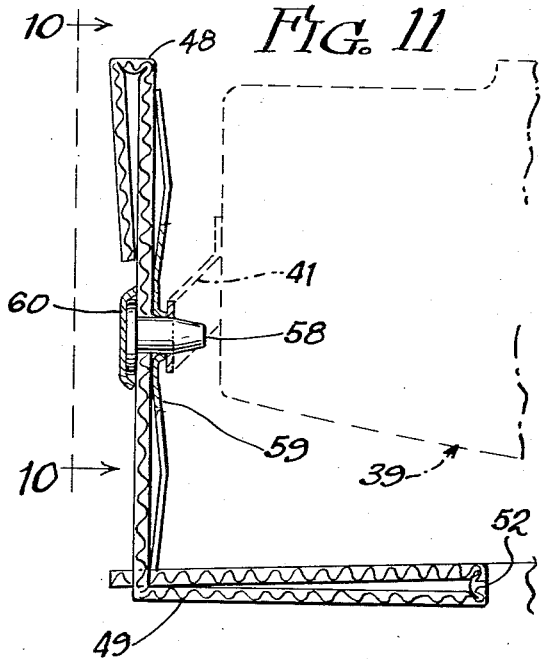
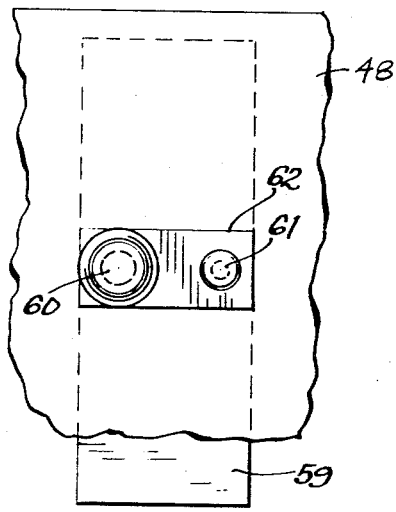
INVENTOR
Edward H. Bendoff
By Nathan N. Kraus
Frank H. Marlow
Attys Sept. 26, 1967   E. H. BENDOFF   3,343,662
PACKAGING MEANS FOR SHADOW MASKS AND THE LIKE
Filed Sept. 9, 1965   5 Sheets-Sheet 4
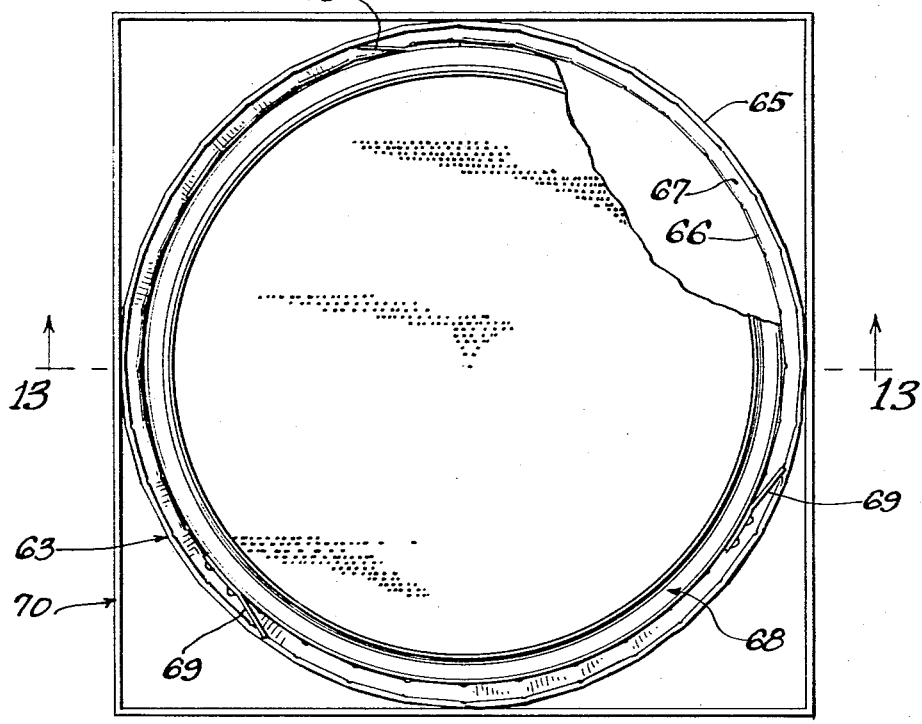
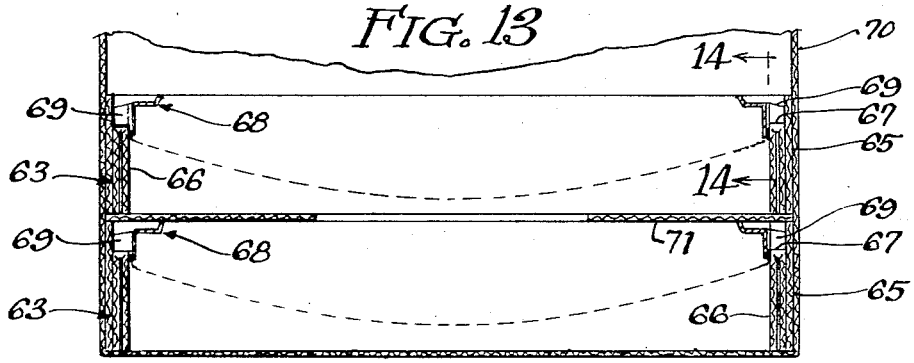
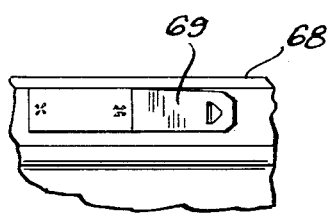
INVENTOR
Edward H. Bendoff
By Nathan N. Kraus
Frank H. Marks
Att'ys Sept. 26, 1967 E. H. BENDOFF 3,343,662
PACKAGING MEANS FOR SHADOW MASKS AND THE LIKE
Filed Sept. 9, 1965 5 Sheets-Sheet 5

INVENTOR
Edward H. Bendoff
By Nathan ...
Frank H. Malos
Attys

United States Patent Office 3,343,662
Patented Sept. 26, 1967

3,343,662
PACKAGING MEANS FOR SHADOW MASKS
AND THE LIKE
Edward H. Bendoff, Lincolnwood, Ill., assignor to Northern Metal Products Company, Franklin Park, Ill., a corporation of Delaware
Filed Sept. 9, 1965, Ser. No. 486,035
3 Claims. (Cl. 206—46)

ABSTRACT OF THE DISCLOSURE

Packaging means for a body having a generally rectangular frame having a relatively fragile concavo-convex plate extending across the frame and having a plurality of mounting brackets extending laterally thereof, the frame also having an opening in the wall opposite the plate, the opening being surrounded by an integral rearwardly extending flange. The packaging means includes a generally rectangular shallow tray structure having a bottom with an opening therein, vertical walls and support means adjacent the walls, and retaining means at the corners. The body is adapted to be received in the tray structure with the brackets thereof resting on the support means with the fragile plate lowermost and in spaced relation to the bottom of the tray structure and with the retaining means engaging the corner portions of the body. When in stacked relation the flange of a body extends into an opening of a tray structure disposed immediately above said body.

---

This invention relates to packaging means for shadow masks incorporated in color television picture tubes, and like structures.

The handling and shipping of shadow masks which are components of color television picture tubes has been a major problem in the industry. A shadow mask comprises a fragile sheet metal foraminous concavo-convex plate which is suitably attached, as by electric resistance welding, to a supporting stamped sheet metal frame. The surface contour of the foraminous plate is highly critical, since when installed within a tube it must register accurately with the phosphor coated glass screen constituting the face of the tube and must be completely free of any imperfections, such as indentations, embossments or creases which would impair the quality of the image on the screen. The fragile character of the foraminous plate is such that repairs cannot be made thereon to remove imperfections should they be present and, as a result, the entire shadow mask must be rejected and discarded as a complete loss.

Heretofore, as the result of unsatisfactory methods and means utilized in the industry for handling and shipping shadow masks, a high incidence of injury to the same in the course of shipment and storage had been experienced, with a consequent high economic loss to those involved in tube manufacture.

Accordingly, it is an object of my invention to provide an improved packaging means for storing and shipping shadow masks which affords a high degree of protection to the masks, such that possible injury to the same is minimized, even under relatively severe conditions of shock and rough handling.

A further object of this invention is the provision of a packaging means of the foregoing character which lends itself to combination with like means whereby a plurality of such packaging means may be assembled into a unit which may be handled easily and conveniently by conventional lift trucks and like apparatus.

A further object of this invention is the provision of packaging means of the foregoing character which is simple and compact in construction, effective in operation and economical to manufacture.

Other and further objects and advantages of this invention will become apparent from the following description, when the same is considered in connection with the accompanying drawings in which FIG. 1 is a top plan view of a preferred embodiment of my invention and showing a conventional rectangular shadow mask disposed therein;

FIG. 2 is a cross-sectional view taken substantially on line 2—2 of FIG. 1 and showing an additional packaging unit in superposed relation.

FIG. 3 is a fragmentary perspective view, partly in cross section and on an enlarged scale, illustrating certain structural details;

FIG. 4 is a cross-sectional view, on an enlarged scale, taken substantially on line 4—4 of FIG. 2;

FIG. 7 is a cross-sectional view taken substantially on line 7—7 of FIG. 5;

FIG. 8 is a cross-sectional view, on an enlarged scale, taken substantially on line 8—8 of FIG. 7;

FIG. 9 is a fragmentary elevational view illustrating a structural detail of a shadow mask;

FIG. 10 is a fragmentary elevational view taken substantially on line 10—10 of FIG. 11 and looking in the direction of the arrows;

FIG. 11 is a cross-sectional view taken substantially on line 11—11 of FIG. 8;

FIG. 12 is a top plan view of another modified embodiment intended for packaging a circular shadow mask and showing such a shadow mask disposed therein;

FIG. 13 is a cross-sectional view taken substantially on line 13—13 of FIG. 12 and showing two packaged circular shadow masks in stacked relation.

FIG. 14 is a fragmentary elevational view on an enlarged scale, taken on line 14—14 of FIG. 13;

Figure 5:
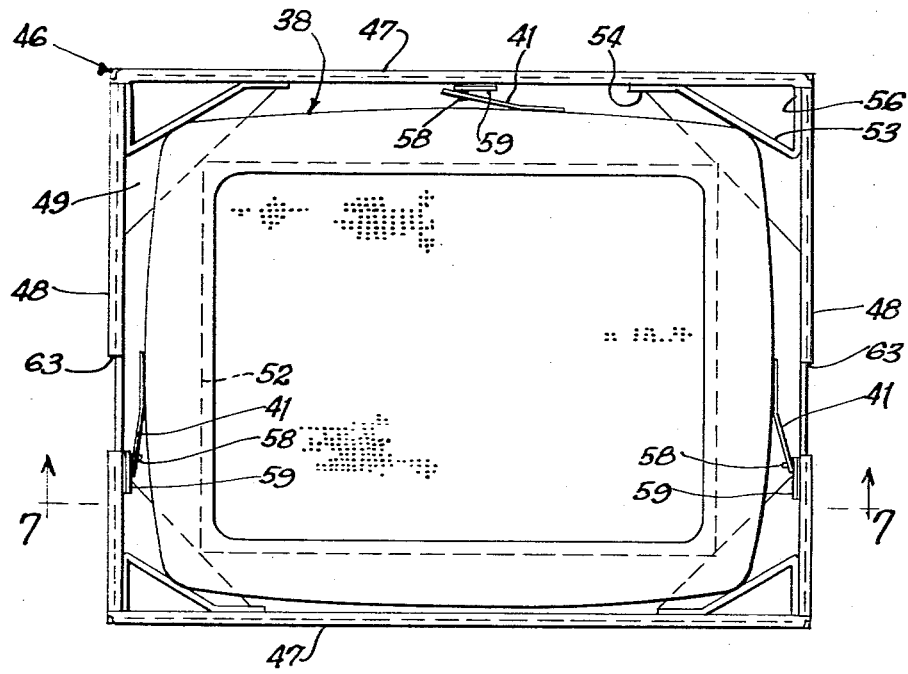
FIG. 5 is a top plan view of a modified embodiment of my invention and showing a shadow mask disposed therein.
Figure 6:
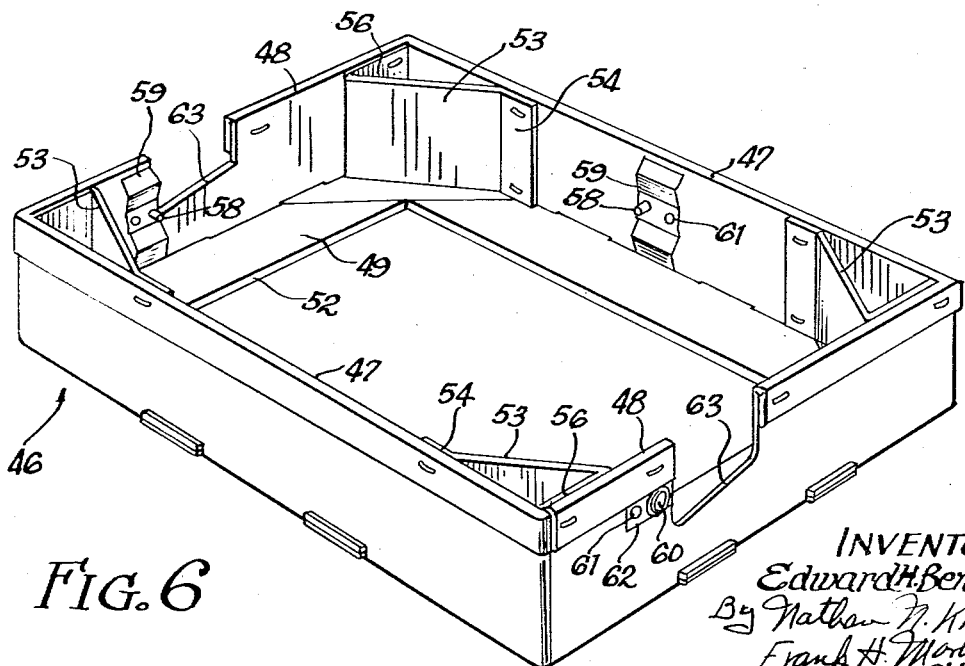
FIG. 6 is a perspective view of the embodiment illustrated in FIG. 5.

Referring particularly to FIGS. 1–4, of the drawings, a packaging means in accordance with a preferred embodiment of my invention comprises a relatively shallow tray structure 20, generally rectangular in plan, and preferably formed of a die-cut blank of corrugated cardboard which has been folded and erected to form the structure presently to be described. The tray structure 20 comprises vertical side and end walls 21 and 22, respectively, each formed of two-play corrugated board and integral with a base 23 having a central rectangular opening 26. As illustrated clearly in FIG. 3 the integral extension portions 24 of the base 23 adjacent the opening 26 are reversely folded to overlie the base 23 with the ends of portions 24 cut off angularly as at 25. The edges of extension portions 24 underlie the lower edges of the inner plies of each of the side and end walls 21 and 22 respectively, said lower edges being appropriately recessed to accommodate the extension portions 24.

Angularly disposed at each corner of the tray structure 20 is a vertical retaining member 28 which includes extensions 29 and 31 arranged as shown. The extensions 29 and 31 are secured as by staples to the walls 21 and 22 respectively.

Disposed medially of the upper end wall 22 and contiguous thereto, as viewed in FIG. 1, is platform member 32. Said platform member is integral with extension portion 24 and is cut and folded as illustrated in FIG. 3 to provide an inclined supporting surface 33 with depending legs 34 and 35, the leg 34 being adhesively secured to the inner surface of wall 22. Similar platform members 36 and 37 arranged allochirally are disposed along opposite end walls 21, substantially in the relationships illustrated in FIG. 1.

A conventional rectangular shadow mask 38 of the type intended to be cradled or supported in the tray structure of my invention is shaped substantially like that illustrated in FIGS. 1 and 2 and includes a stamped sheet metal frame 39 and a fragile foraminous plate 40 in concavo-convex form mounted thereon. The shadow mask 38 is provided with three mounting brackets 41 (a, b and c) which are secured to the walls of the frame 39 in the relationship illustrated in FIG. 1. Each of said brackets includes a resilient arm portion 42 directed angularly away from the frame 39, the terminal portion of each arm portion 42 having a generally triangular aperture 43 therein. The longitudinal axis of each bracket 41 is inclined downwardly, as illustrated clearly in FIGS. 2 and 4.

As illustrated in FIG. 4 the angle of inclination of each supporting surface 33 corresponds to the angle of inclination of a corresponding bracket 41 and each supporting surface 33 is so disposed as to be in registration with a corresponding bracket 41 when a shadow mask 38 is positioned within a tray structure 20. As will be seen in FIG. 2, the shadow mask 38 is positioned within tray structure 20 so that the convex formation of the foraminous plate 40 is disposed downwardly and the lowermost point of said formation is spaced from the plane of the base 23 to afford desired clearance so as to avoid contact with a similarly packaged shadow mask disposed therebelow in stacked relation. Positioning of the shadow mask 38 in the aforesaid manner minimizes the possibility of injury to or deformation of the plate 40, in the event that the packaged unit is subjected to shock stresses, as when roughly handled or inadvertently dropped. Lateral or longitudinal movement of the shadow mask 38 within the tray structure 20 is further prevented by reason of the corner disposed retaining members 28 which abut the corner portions of the shadow mask 38, as illustrated in FIG. 1, and prevent inadvertent displacement of the shadow mask relative to the tray structure.

The tray structures 20 are adapted to be disposed in stacked relation with one tray structure resting on the one immediately therebelow. As seen in FIG. 2 the flange F of one shadow mask received in a tray structure extends into the opening 26 of a tray structure in superposed relation thereto. Also the base 23 of an upper tray structure overlies the frame 39 of a shadow mask in a lower tray structure so that all of the shadow masks in stacked relation are held against vertical displacement. Thus, each shadow mask, is completely cradled against relative movement both in vertical and lateral directions and is protected against injury.

Referring to FIGS. 5 through 11 of the drawings, which illustrate a modified embodiment of my invention, the numeral 46 indicates a tray structure similarly formed of corrugated cardboard and comprising side and end walls 47 and 48, respectively. In this instance the walls 47 and 48 are of a single ply with the upper marginal edge portion of each wall being reversely folded downwardly and stapled to afford increased rigidity. The tray structure includes a bottom 49 having a central substantially rectangular opening 52 and constructed like the first described embodiment. Retaining members 53 similar to the members 28 of the first described embodiment are provided with extensions 54 and 56 which are stapled to the walls 47 and 48, respectively.

As viewed in FIG. 5, the upper end wall 47 and side walls 48 are each pierced each to receive a headed pin 58 having a tapered shank which is directed inwardly of the tray structure. Each pin passes through an aperture in a metal plate 59 which is riveted to the wall 47, as at 61, the rivet also securing one end of a resilient arm 62 which is provided with a dished end portion 60 adapted to engage against the head of pin 58 and to retain the same against displacement. The aperture in plate 59 affords a bearing for pin 58 and the plate affords reinforcement for the wall to carry the load placed on the pin as well as to protect the wall surfaces against wear and injury thereto. The pins and plates 58 and 59 respectively disposed at the side walls 48 are in allochiral relation and are located so that the pins are adapted to engage in the apertures 43 of respective brackets 41, as is also true of the pin 58 in the upper end wall 47. A cut-out 63 (FIG. 6) is provided in each of the side walls 48 immediately adjacent the plates 59, for a purpose as will be hereinafter explained.

A rectangular shadow mask 38 is intended to be received within the tray structure 46 and to be supported on pins 58 with the pins engaging in the apertures 43 of respective brackets 41. By reason of the resilient bias of the brackets 41, the pins 58 are snugly received within the apertures 43 so that the shadow mask is supported snugly and securely, in the manner illustrated in FIGS. 7 and 11. The cut-outs 63 in the walls 48 afford clearance for manipulating the brackets 41 to effect engagement or disengagement of the same with respective pins 58. The tray structures 46 are adapted to be positioned in stacked relation in the same manner as illustrated in FIG. 2.

FIGS. 12–14 illustrate another modified embodiment of my invention utilized for packaging circular type shadow masks. In this embodiment the packaging means is also in the form of a shallow tray structure 63 comprised of an outer circular wall 65 and a concentric inner circular member 66 all formed of corrugated board, the inner member preferably being of double ply board and being of lesser height than the outer wall so as to provide an annular shoulder 67.

A conventional circular shadow mask 68 similarly is provided with three spaced mounting brackets 69 and the shadow mask is adapted to be placed within the tray structure 63 with the brackets 69 resting on the shoulder 67 of the inner circular member 66. As will be apparent by reference to FIGS. 12 and 13, the shadow mask 68 fits snugly within the area defined by the inner circular member 66 while the mounting brackets 69 of the shadow mask resiliently engage against the inner surface of the outer wall 65. Thus, the shadow mask is snugly and firmly supported within the tray structure 63 and protected against injury. As will be noted in FIGS. 12 and 13, a plurality of tray structures 63 each supporting a shadow mask 68, are adapted to be arranged in stacked relation within a container 70 which is generally square in cross-section. A layer pad in the form of a sheet of corrugated board 71 having a central cutout is positioned between adjacent tray structures for added protection.

Figure 15:
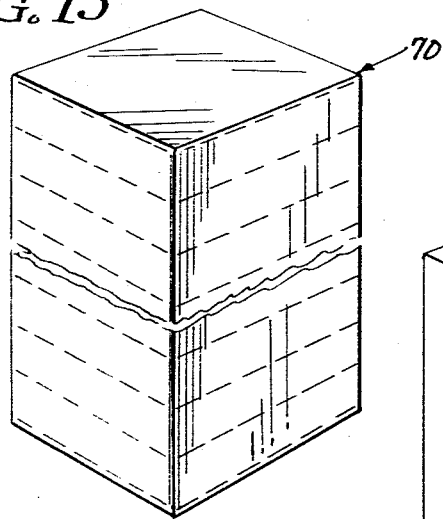
FIG. 15 is a perspective view of a container for housing a plurality of packaging units in stacked relation.
Figure 16:
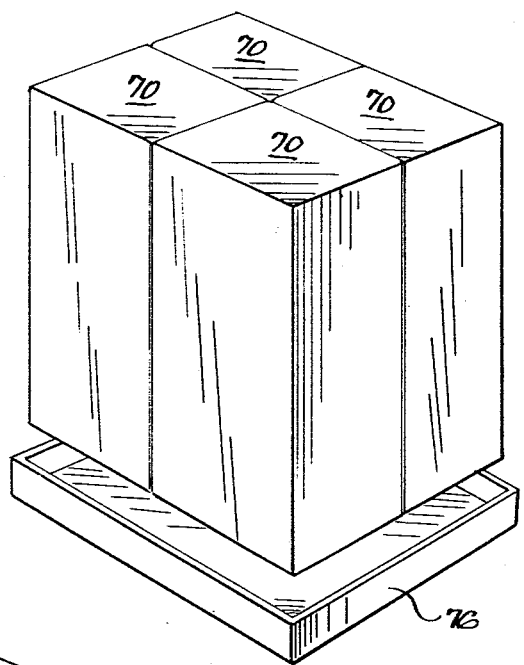
FIG. 16 is a perspective view illustrating a plurality of containers arranged in a group formation so as to be assembled with a lower cap member which is shown in spaced relation.
Figure 17:
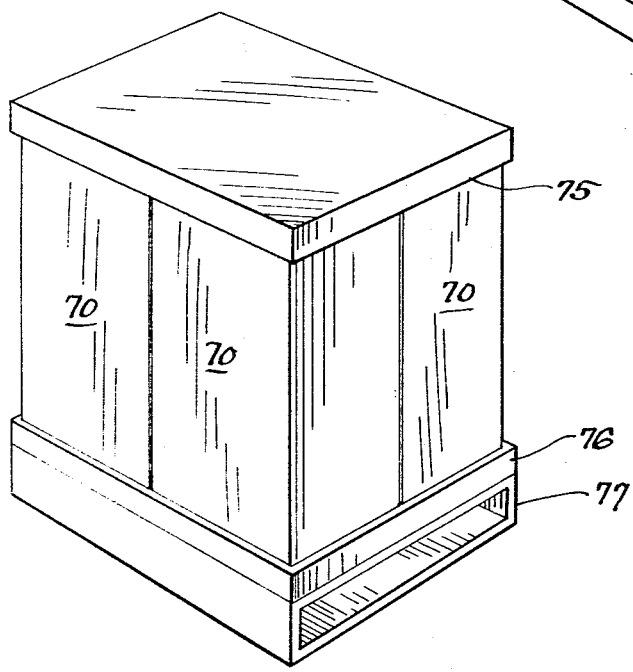
FIG. 17 is a perspective view illustrating a group formation of containers assembled with upper and lower cap members and positioned on a skid platform.

FIG. 15 illustrates a corrugated carton or container 70 in which a plurality of tray structures, according to any of the foregoing embodiments, each carrying a shadow mask, are arranged in stacked relation within the carton. I have found it practical and convenient to stack as many as ten tray structures one on top of another within a carton. Preferably four of such cartons are arranged in clustered relation, as illustrated in FIG. 16, and are so retained securely by upper and lower cap members 75 and 76 respectively which engage the tops and bottoms of the cartons 70, in the manner illustrated in FIG. 17, to afford a shipping or storage unit which may be supported on a conventional skid platform 77. It will be noted that the use of the top and bottom cap members eliminates the necessity for roping or banding the cartons to retain the same in assembled relation.

As an alternative construction, not illustrated, the skid 77 may be provided with flanges fixed to the skid, the flanges performing the function of a lower cap member to retain the bottoms of the cartons in clustered relation.

It will be understood that while the several embodiments have been described as being formed of corrugated board, other suitable materials may be employed such as fibre board, wood, plastics and other materials.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:
1. In combination
   (a) a plurality of packaging means arranged in stacked relation within a container,
   (b) each of said packaging means comprising a relatively shallow tray structure having vertical walls and support means adjacent said walls,
   (c) each of said tray structures containing a body including a frame having a relatively fragile plate in concavo-convex formation extending across said frame and having a plurality of mounting brackets extending laterally thereof,
   (d) said brackets being rested on said support means with said plate being lowermost and in spaced relation to the bottom of said structure.
2. The invention as defined in claim 1 in which each frame has an integral rearwardly extending flange surrounding an opening in the rear wall thereof and in which each tray structure has an opening in the bottom thereof to receive the flange of an adjacent frame disposed immediately therebelow when said packaging means and bodies are arranged in stacked relation.
3. Packaging means for a body having a general rectangular frame having a relatively fragile concavo-convex plate extending across said frame and having a plurality of mounting brackets extending laterally thereof, said means comprising
   (a) a generally rectangular shallow tray structure having a bottom having an opening therein, vertical walls and support means adjacent said walls,
   (b) said tray structure being adapted to receive said body with said brackets being rested on said support means whereby said body is supported with the plate lowermost and in spaced relation to the bottom of the tray structure, and
   (c) retaining means within said tray structure and extending diagonally across each of the corners to engage the corner portions of said body to prevent lateral displacement of the same relative to said tray structure.

References Cited

UNITED STATES PATENTS

| | | |
|---|---|---|
| 67,391 | 7/1867 | Wilcox. |
| 2,487,528 | 11/1949 | Dawson _____ 206—46 |
| 2,674,433 | 5/1954 | Mautiver _____ 206—46 |
| 2,766,993 | 10/1956 | Reichelt _____ 206—46 |
| 2,843,257 | 7/1958 | Collins _____ 206—46 |
| 3,006,462 | 10/1961 | Boeye _____ 206—46 |
| 3,116,866 | 1/1964 | Boran _____ 229—14 X |
| 3,127,698 | 5/1964 | Smithers. |

FOREIGN PATENTS

| | | |
|---|---|---|
| 556,550 | 2/1957 | Italy. |
| 1,138,895 | 10/1962 | Germany. |

LOUIS G. MANCENE, *Primary Examiner.*